United States Patent [19]
Glesmann

[11] 3,717,177
[45] Feb. 20, 1973

[54] PROPORTIONAL GAS MIXING APPARATUS

[75] Inventor: Donald E. Glesmann, St. Paul, Minn.

[73] Assignee: Tescon Corporation, Minneapolis, Minn.

[22] Filed: March 22, 1971

[21] Appl. No.: 126,700

[52] U.S. Cl. .........137/607, 137/505.21, 137/505.37
[51] Int. Cl. ..............................................F16k 19/00
[58] Field of Search.137/7, 87, 98, 100, 114, 505.21, 137/505.37, 604, 606, 607

[56] References Cited

UNITED STATES PATENTS

| | | | |
|---|---|---|---|
| 2,313,797 | 3/1943 | Bailey | 137/100 |
| 3,534,753 | 10/1970 | Ollivier | 137/7 |
| 3,324,872 | 6/1967 | Cloud | 137/98 |
| 3,217,730 | 11/1965 | Banning, Jr. | 137/607 X |
| 2,047,101 | 7/1936 | Grove | 137/505.37 |
| 3,464,434 | 9/1969 | Nielsen | 137/7 X |
| 3,521,658 | 7/1970 | Sandow | 137/100 |

FOREIGN PATENTS OR APPLICATIONS

| | | | |
|---|---|---|---|
| 86,117 | 4/1896 | Germany | 137/100 |
| 1,023,900 | 1/1953 | France | 137/98 |

*Primary Examiner*—Robert G. Nilson
*Attorney*—Dugger, Peterson, Johnson & Westman

[57] ABSTRACT

Proportional gas mixing apparatus having a housing separated into first, second and third chambers by two spaced diaphragms, a first and a second balanced valve assembly respectively operated by a first and a second of said diaphragms to control the gas pressure in the first and third chambers respectively, a pressurized source of the first gas supplying gas through the first valve assembly to the first chamber and through a pressure regulator to the second chamber, a pressurized source of a second gas for supplying gas through the second valve assembly to the third chamber, a mixer assembly having first and second inlets in fluid communication with the first and third chambers respectively, an outlet, first and second variable area orifices mechanically coupled to selectively provide a proportional inverse area relationship between each orifice for controlling fluid flow from the first and second inlets respectively to the outlet, and a null meter fluidly connected for indicating any pressure differential between the first and third chambers, one of the valve assemblies having a null adjustment.

14 Claims, 4 Drawing Figures

INVENTOR.
DONALD E. GLESMANN
BY
Dugger, Peterson, Johnson & Westman
ATTORNEYS

PATENTED FEB 20 1973

INVENTOR.
DONALD E. GLESMANN
BY
Dugger, Peterson, Johnson & Westman
ATTORNEYS

PROPORTIONAL GAS MIXING APPARATUS

BACKGROUND OF THE INVENTION

Gas mixing apparatus for selectively supplying, mixing, and controlling the proportion of one gas in a mixture of two gases wherein the gases are available from a separate pressurized source for each gas.

In the prior art it is old to provide a gas proportioning valve having inlet gases flow in separate streams through the two sides of a nulling pressure regulator to two sets of metering orifices as more fully set forth in "The Journal of The American Medical Assotiation," November 6, 1967, Volume 202, Pages 531–534. However such a prior art device does not provide for an infinitely variable range of the proportions of gases. In order to overcome limitations of prior art devices, as well as others, this invention has been made.

SUMMARY OF THE INVENTION

Proportional gas mixing apparatus having a housing divided into a first, second and third chamber by a first and second diaphragm, a first and second valve assembly controlled by the first and second diaphragm respectively for controlling the pressure in the first and third chambers, a gas source supplying a first gas under pressure to the first valve assembly and through a first regulator to the second chamber, a gas source supplying a second gas under pressure to the second valve assembly and a gas mixing device for receiving gas from the first and third chambers and controlling the flow rate of the gases therethrough to provide the selected portion of one gas relative the two gases at its outlet.

One of the objects of this invention is to provide new and novel gas mixing apparatus for proportionally mixing two gases, by weight or volume, and maintain the selected proportion within close limits, even with varying inlet pressures and varying output flow rate. Another object of this invention is to provide new and novel gas proportionating apparatus for selectively supplying adjusted proportions of two gases and minimize errors in the proportions of gases, even at low flow rates.

Figure 1:
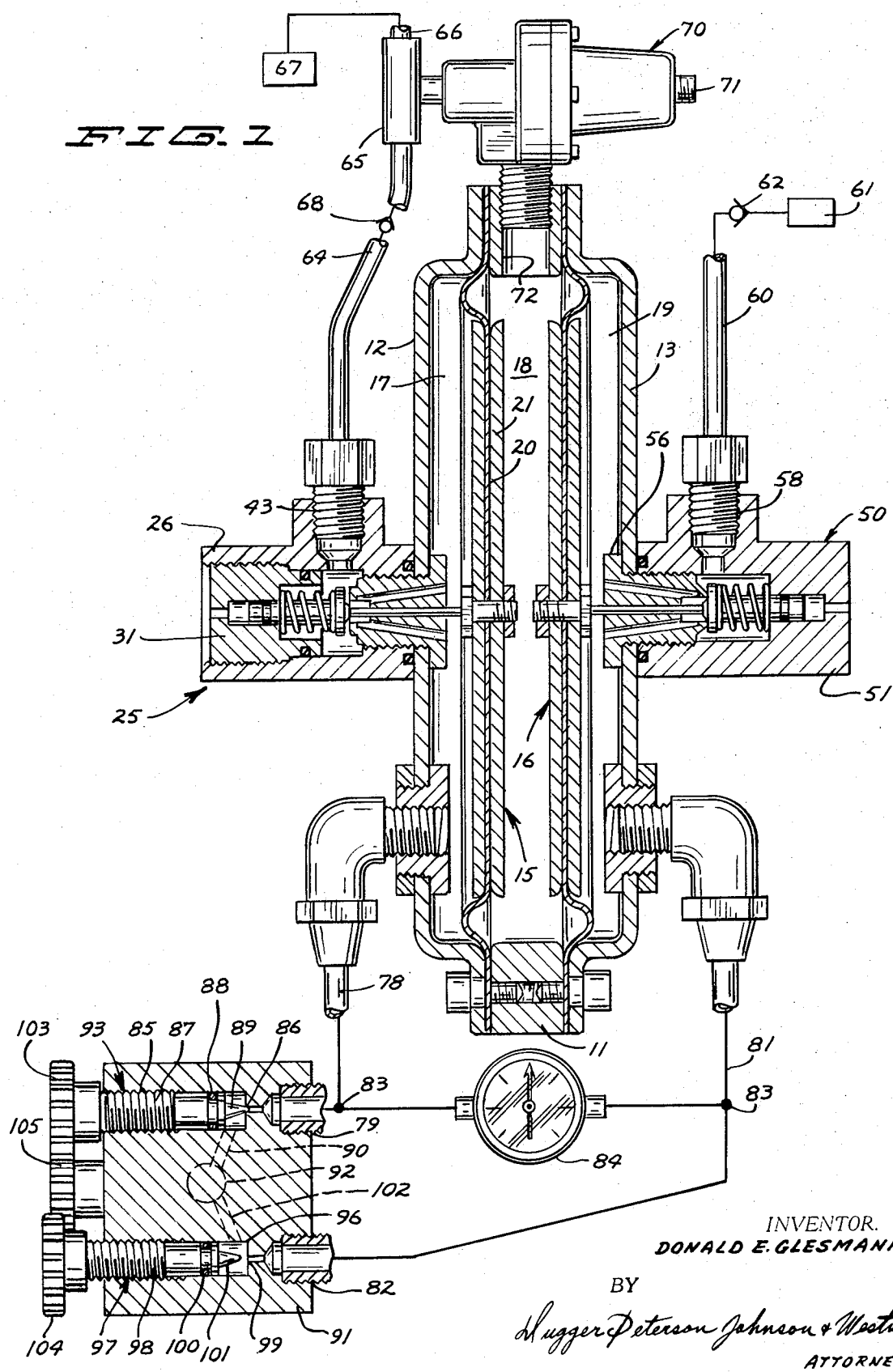
FIG. 1 is a somewhat schematic view of the apparatus of the invention, portions being illustrated in cross section.
Figure 2:
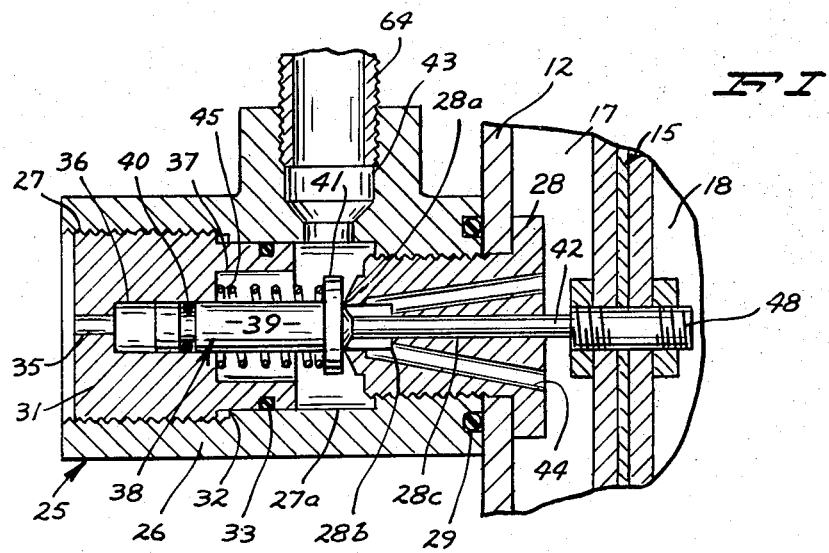
FIG. 2 is an enlarged fragmentary cross sectional view of a portion of the apparatus of this invention, said view in particular illustrating one of the valve assemblies.

Referring now in particular to FIG. 1, there is illustrated a housing that has an annular wall 11, and end walls 12 and 13, a diaphragm 15 having its annular peripheral edge extending between and secured to the housing intermediate walls 11 and 12, and a diaphragm 16 having its annular peripheral edge extending between and secured to the housing between walls 11 and 13. Other than for the openings described hereinafter, the diaphragms separate the housing into three closed chambers, there being a chamber 17 between wall 12 and diaphragm 15, a chamber 18 between diaphragms 15 and 16, and a chamber 19 between diaphragm 16 and wall 13. Each of the diaphragms includes a flexible member 20 and a central reinforcing disc 21 of a smaller diameter than wall 11 on either side of the flexible member.

Mounted on end wall 12 is a balanced valve assembly, generally designated 25, that includes a valve body 26 having an annular groove on one end thereof that mounts an O-ring 29 for forming a fluid seal with the outer surface of the end wall 12. An axially elongated valve bore 27 is provided in the valve body, the threaded end portion of a fitting 28 being threaded into the adjacent threaded part of the valve body bore. The fitting extends through a central aperture provided in the end wall 12 and has an enlarged diametric flange within chamber 17 that abuts against the inner surface of the end wall to in cooperation with the valve body mount the valve assembly on the end wall. A gasket is provided between the enlarged diametric portion of the fitting and the end wall for forming a fluid seal therebetween.

In the threaded end portion of the valve bore that is opposite fitting 28, there is threadably mounted a plug 31 having a screwdriver slot in one end to facilitate adjusting the axial position of the plug relative the valve body. The valve body has an annular shoulder 32 facing a corresponding shoulder on the plug for limiting the axial movement of the plug in the direction toward the end wall 12. The plug inner end portion has an annular groove that mounts an O-ring 33 for forming a slidable seal with the constant diameter intermediate portion 27a of the valve bore. The plug has a bore axially extending therethrough that includes a reduced diameter vent portion 35 that opens to the ambient atmosphere, an intermediate diameter portion 36, that at one end opens to vent 35 and at the opposite end opens to the enlarged diameter bore portion 37. An axially elongated valve stem member, generally designated 38, has a plunger portion 39 slidably extended into bore portion 36, said plunger portion having a groove in which an O-ring 40 is mounted to form a sliding seal with the peripheral wall defining bore portion 36. One end of the valve plunger is integrally joined to one surface of the enlarged diameter piston 41 while the control rod portion 42 has one end integrally to the opposite surface of said piston. The diameter of the control rod 42 is substantially smaller than the diameter of the valve plunger 39 while the diameter of the valve plunger is substantially smaller than the diameter of the piston. Further the diameter of the piston is substantially smaller than the diameter of bore portion 37 whereby the piston is movable into the bore portion 37, the length of the valve plunger being such that the piston is not abuttable against the shoulder formed by bore portions 36, 37.

The control rod 42 extends through the bore 28b, 28c formed in fitting 28 and through a central aperture in a diaphragm 15 to have one end abut against the adjacent surface of a connecting member 48 of the diaphragm 15. Connecting member 48 has a bolt portion extended through central apertures in diaphragm portions 20, 21 to bolt them together and gaskets or O- rings (not shown) to block fluid flow through the diaphragm apertures. Member 48 provides a wear surface for the connecting rod, the connecting rod not being attached to the diaphragm but is resiliently retained in abutting relationship therewith by spring 45. As may be noted, the diaphragm 15 is sufficiently spaced from fitting 28 to permit substantial movement of the diaphragm in the direction toward the fitting.

The valve body includes an annular boss 43 having a bore extending therethrough to open to bore portion 27a between the fitting and the plug. The fitting has an annular valve seat 28a for forming a fluid seal with the piston 41 to block fluid communication between bore portion 27a and the fitting bore 28b that opens through the valve seat. The piston has an annular recess (not shown) facing the valve seat in which a resilient gasket is mounted to provide a good fluid seal with the valve seat. A plurality of passageways 44 at their one ends open to bore portion 28b and at the opposite ends to chamber 17.

A coil spring 45 is provided on plunger 39 and has one end bearing against the shoulder formed by bore portions 36, 37 and an opposite end against the piston for resiliently urging the valve stem assembly 38 in a direction that piston 41 seats against valve seat 28a.

Figure 3:
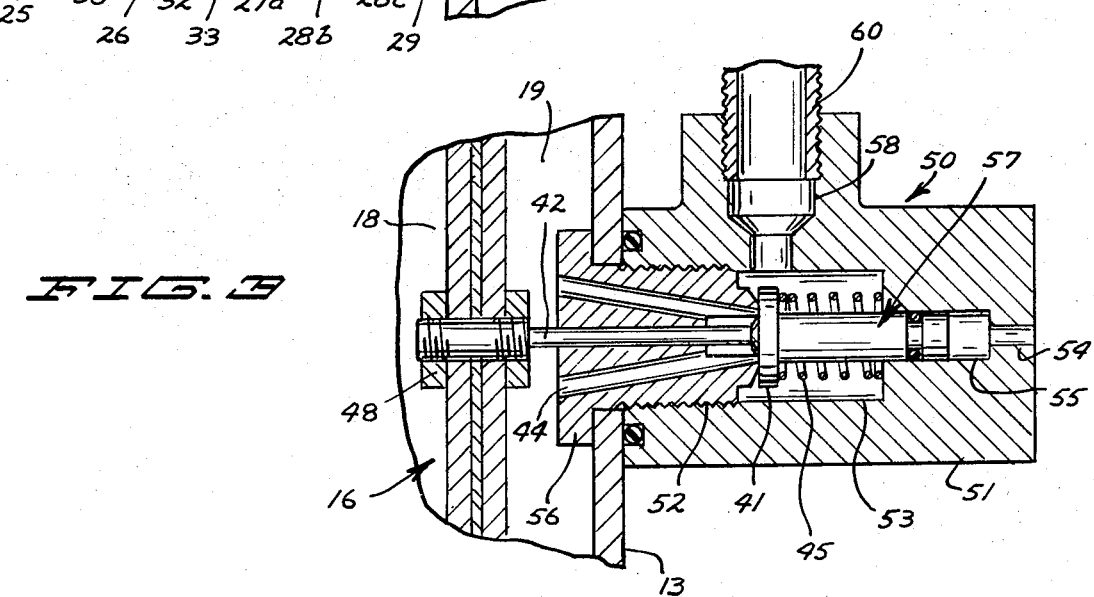
FIG. 3 is an enlarged fragmentary cross sectional view of another portion of the apparatus of this invention, said view in particular illustrating a second valve assembly.
Figure 4:
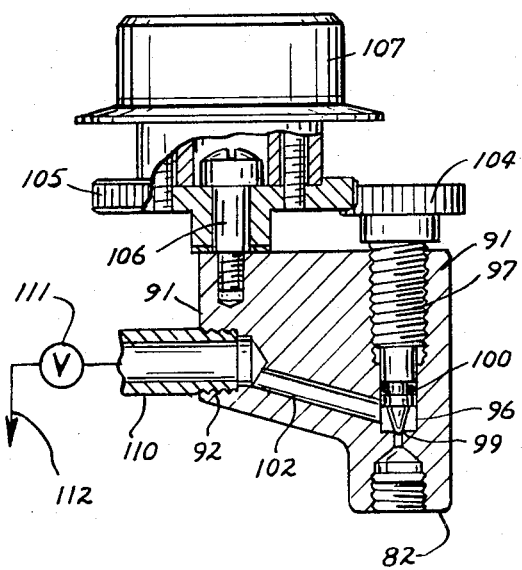
FIG. 4 is a cross sectional view of the mixer assembly.

A valve assembly, generally designated 50 (see FIG. 3), is mounted by end wall 13, valve assembly 50 including a valve body 51. The valve body 51 has a bore extending axially therethrough that includes a vent portion 54 opening to the ambient atmosphere, an intermediate diameter portion 55 that at one end opens to the vent 54 and at the opposite end to the enlarged diametric portion 53, and a threaded end portion 52 that at one end opens to portion 53. A fitting 56 has a flanged end portion within chamber 19 and an opposite end portion threadably connected to the threaded bore portion 52 for mounting the valve assembly on end wall 13 in the manner described with reference to valve assembly 25 being mounted on wall 12. Further valve assembly 50 includes a valve stem member 57 that is of the same construction as valve stem member 38, the one end portion of the control rod of assembly 57 being resiliently retained in abutting relationship with diaphragm 16 through the provision of spring 45 while the plunger portion of said assembly is slidably extended into bore portion 55. The coil spring 45 is provided in bore portion 53 to have one end abut against the shoulder formed by bore portions 53, 55 for resiliently urging valve stem member 57 in a direction toward end wall 12 to resiliently retain the piston thereof seated against the valve seat of fitting 56. Further the valve assembly 50 includes a boss having a bore 58 extended therethrough to open to bore portion 53 between the fitting and the shoulder formed by bore portions 53, 55.

One end of a conduit 60 is connected to the boss of valve assembly 50 while the opposite end is connected to a first source of gas under pressure 61. Advantageously a check valve 62 is provided in line 60 to permit gas flow through the line 60 only in a direction from supply 61 toward the valve assembly and through inlet bore 58 into bore portion 53.

A source of a second gas under pressure 67 is fluidly connected by a conduit 66 to one leg of a T-joint 65, a second leg of the T-joint being fluidly connected by a conduit 64 to the boss of valve assembly 25 for providing fluid under pressure to valve inlet bore 43. A check valve 68 is provided in line 64 to permit gas flow through line 64 only in a direction toward valve bore 43. The third leg of the T-joint is fluidly connected to the inlet port of a conventional pressure regulator 70 while the pressure regulator is connected to the housing 11–13 to have the outlet port of said regulator 70 conduct fluid through bore 72 of the annular member 11 into chamber 18. Regulator 70 has an adjustment member 71 to permit controlling the fluid flowing therethrough into chamber 18 to maintain a constant reference therein that is lower than the pressure in either of sources 67, 61. Regulator 70 is of a construction that in the event the pressure at the regulator inlet drops below that in chamber 18, fluid flows from chamber 18 and through the regulator to line 66.

A fluid conduit line 78 has one end mounted by end wall 12 to open to chamber 17 and an opposite end threadedly connected in the inlet port 79 of the mixer assembly, generally designated 80. Similarly, a second fluid conduit line 81 has one end mounted by wall 13 to open into chamber 19 and an opposite end threadedly connected into the inlet port 82 of the mixer assembly. Each of lines 78, 81 is provided with a T-joint 83, a nulling meter 84 being connected between the T-joints 83 to indicate the difference of fluid pressure, if any, between lines 78, 81.

The mixer assembly includes a needle valve bore 85 that through orifice 86 opens to the inlet port 79. A threaded valve stem member, generally designated 93, has a threaded portion 87 threaded in the bore 85, a groove mounting an O-ring 88 to form a sliding fluid seal between the valve stem and bore 85 axially intermediate the outlet side of orifice 86 and threaded portion 87, and a generally conical tip terminal end portion 89 for selectively blocking fluid flow from inlet 79 to the inlet side of orifice 86 and through the orifice 86 to the adjacent end portion of bore 85. A fluid passageway 90 is provided in the mixer body 91 to at one end open to the outlet bore 92 and at the opposite end open to bore 85 axially between the O-ring 88 and the orifice 86.

The mixer body 91 also includes a second needle valve bore 96 for mounting a second needle valve, generally designated 97, that has a threaded portion 98 threadedly mounted in the bore. Needle valve 97 is also provided with a groove for mounting an O-ring 100 to form a fluid seal with the wall defining bore 96 and a conical tip terminal end portion 101 that is of a size for selectively blocking orifice 99. The end of bore 96 remote from the threaded portion opens to the outlet side of orifice 99 and through orifice 99 to the inlet port 82. A passageway 102 fluidly connects the outlet bore 92 to the bore 96 at a location between orifice 99 and the O-ring.

The orifices 86, 99 including the openings therethrough are of the same size and shape as are the conical portions 89 and 101 which are of progressively larger in transverse cross sectional area in a direction away from the orifices. Further, the thread characteristics of the threaded portions 87, 98 are the same other than one has a right hand thread and the other has a left hand thread. Accordingly, if each of the valve stems is threaded in the same angular direction the same angular mount, the valve stems will move relative their respective orifice the same distance but in an opposite axial direction relative thereto.

On each of the needle valves 93, 97, there is respectively provided a gear 103, 104: gears 103 and 104 being of identical construction. A cap screw 106 mounts a gear 105 in intermeshing relationship with each of the gears 103, 104, the cap screw being mounted by the mixer body. An adjustment knob 107 is attached to the gear 105 by screws to prevent the knob rotating relative to gear 105. Gear 105 is of a substantially larger diameter than the diameter of either of the gears 103, 104. Advantageously, a pointer (not shown) is provided on the main body 91 while spaced indicia indicating the range from zero to 100 percent is provided on the knob for purposes to be set forth hereinafter.

An outlet line 110 has one end threadedly connected to bore 92 and an opposite, discharge end (not shown). A valve 111 is provided in line 110 for controlling the rate of flow of fluid through line 110, valve 111 having a shutoff position to block fluid flow through line 110 to its discharge end 112.

For purposes of describing the use of the apparatus of this invention, it will be assumed that the source of fluid 67 contains oxygen under pressure and that the source of the fluid 61 contains nitrous oxide under pressure. When fluid under pressure is being applied to each line 66, 60 and the regulator 70 adjusted to maintain a reference pressure in chamber 18 at a substantially lower pressure than that available at each of sources 61, 67, oxygen flows through the regulator 70 and into the chamber 18. This results in the diaphragm 15 moving in a direction toward valve assembly 25, and accordingly moving the piston 41 away from the nozzle port 28a, provided the pressure in chamber 17 is sufficiently below that in chamber 18. As a result, there is established a fluid flow path from bore 43 and through passageways 44 to the chamber 17, which remains open until the pressure in chambers 17 is sufficiently high to establish an equilibrium condition with the fluid under pressure existing in chamber 18. Now, if no fluid is flowing from chamber 17 to and through line 78, the spring 45 pushes the valve stem assembly 38 to block further fluid flow from inlet 43 to chamber 17.

Similarly, if at the time that the oxygen in chamber 18 is at a substantially greater pressure than that required in chamber 19 to retain the diaphragm 16 in an equilibrium condition, the valve stem assembly 57 is moved by the diaphragm to permit fluid flow from inlet 58 to chamber 19 until an equilibrium condition is established. At this time, by looking at the nulling meter 84, it is ascertained whether or not the pressures in lines 78 and 81 are equal. If not, plug 31 is threaded in the appropriate direction, together, if necessary, turning the adjustment knob 107 in the appropriate direction and opening valve 111 to permit fluid flowing through lines 78, 81 until the pressure in lines 78 and 81 is the same. At this time the pressure on the inlet sides of the orifices is the same, and the pressure on the outlet side of the orifices is the same. As a result, when fluid flows through the orifices, the pressure drop across the orifices is the same. Assuming that the mixer assembly has been calibrated with reference to oxygen, then the knob 107 is turned until the desired percent oxygen is indicated on the calibrated knob (assuming appropriate indicia is provided on one of the knobs or mixer body and a pointer provided on the other). As the knob 107 is rotated, both of the gears 103, 104 are rotated in the same angular direction the same angular amounts. As a result the conical portions 89, 101 are moved relative the orifices 86, 99 respectively the same amount in opposite directions to change the area of opening in proportional inverse area relationship between each orifice, the adjustment knob being movable between a position tip 89 blocks fluid flow through orifice 86 and a position tip 101 blocks fluid flow through orifice 99.

Thus, if the gases to be mixed have very similar physical properties, the proportions of gases in the resulting gas mixture will be directly proportional to the open areas of the orifices, i.e., if one orifice is 75 percent open and the other 25 percent open, the ratio of gases flowing through the orifices will be 3 to 1. However, mixing of the dissimilar gases requires changing the calibration of the knob, or changing the sizing of the orifices, such that the flow rate of both gases, expressed in either weight or volume, not both, will be indicated by the pointer and indicia in terms of the proportion of one gas in the gas mixture.

During use gears 103, 104 are axially movable relative gear 105 but remain in intermeshing relationship with gear 105 both when tip portion 99 blocks fluid flow through orifice 86 and when tip portion 101 blocks fluid flow through orifice 99.

In the event the apparatus of this invention is being used in combination with analgesic equipment, where it is essential that the flow of the second gas be stopped in event of the discontinuance of oxygen, or the pressure level of oxygen at the source falls below that in chamber 18, than the oxygen source is connected to the regulator 70. As a result, when the pressure at the inlet of regulator 70 drops below the preselected level of pressure to be maintained in chamber 18, gas fluid in chamber 18 exhausts back through the regulator main valve and as a result fluid flow through each of the valve assemblies 25, 50 to chambers 17, 19 respectively is blocked.

In the event the apparatus of this invention is being used for respiratory therapy where it is essential that the discontinuance of flow of one gas will not stop the flow of the other gas, then regulator 70 is of conventional construction that prevents gas in chamber 18 from exhausting back through the regulator main valve to line 66 and as a result, the residual gas pressure in chamber 18 will continue to permit valves 25 and 50 opening to permit the other gas to flow through the apparatus to discharge 112.

The null adjustment feature, i.e., plug 31, is provided so that the spring pressure acting against valve stem assembly 38 can be adjusted and thereby provide an adjustment of the force assembly urging diaphragm 15 toward diaphragm 16. As result, valve assembly 25 can be readily adjusted whereby equal fluid pressure is obtained and maintained in chambers 17, 19. In view of the above, during use, the fluid pressure at the inlet sides of orifices 86, 99 is equal, while due to the outlet sides of the orifices are unobstructedly fluidly connected to a common outlet 92, the pressure on the outlet sides of the orifices is the same regardless of the positions of conical portions 89, 101 relative the respective orifice.

To be mentioned is that if the accuracy of the ratio of the mixed gases is critical, then the nulling meter would be part of the unit. However, if its not critical than once the adjustment of plug 31 has been made, the nulling meter may be removed and not sold as part of the unit.

Also to be mentioned is that the cross sectional area of bore 36 is the same as that as bore 28b while the cross sectional areas of the corresponding bore of valve assemblies 50 are the same. That is each of assemblies 25, 50 are of the same construction other than a plug is provided in valve body 27 and body 51 is integrally formed without a plug.

Applications of the apparatus of this include proportional mixing of (a) oxygen and air for inhalation respirators and (b) oxygen and nitrous oxide for dental analgestic equipment. For such applications it is highly desirable that the accuracy of proportions of the gases at the outlet of conduit 110 be maintained at both high and low flow rates, and for any setting of the mixer; and accordingly that the ratio of the effective area of the diaphragms to the cross sectional area of the valve seats of fittings 28, 56 be at least 600 to 1 and preferably at least 900 to 1. Another application of the apparatus is for mixing gases for industrial purposes. One example of an industrial use is the metering of gases for inert gas welding.

What is claimed is:

1. Proportional gas mixing apparatus for receiving a first gas and a second gas from separate sources of pressurized gases and mixing the gases in the desired proportions comprising a housing having a first wall, and a second wall, a first and second diaphragm mounted by the housing to divide the housing into a first, a second and a third chamber with the second chamber between the first and third chambers, the first wall and first diaphragm defining at least part of the first chamber and the second wall and second diaphragm defining at least part of the third chamber, said housing having an inlet first port opening to the second chamber, a pressure regulator connected to the housing for supplying a gas under pressure through the inlet first port to the second chamber, an operable first valve assembly adapted for connection to the first source and connected to the housing for supplying gas under pressure to the first chamber, an operable second valve assembly adapted for connection to the second source and connected to the housing for supplying gas under pressure to the third chamber, said first and second valve assemblies including first and second means respectively abutting against the first and second diaphragms for blocking gas flow into the first and third chambers and opening a gas flow path to the respective first and third chamber when the pressure is below an equilibrium state relative the pressure in the second chamber, a mixer assembly having spaced inlet second and third ports and an outlet port, first conduit means for placing the second port in fluid communication with the first chamber and second conduit means for placing the third port in fluid communication with the third chamber, said mixer assembly having a first passageway including a first orifice fluidly connecting the second inlet to the outlet, a second passageway including a second orifice fluidly connecting the third inlet to the outlet and adjustable means cooperating with the orifices to substantially simultaneously proportionally inversely vary the effective areas of openings of the orifices to control the flow of gases therethrough, one of the valve assemblies including a valve body having a valve bore extended therethrough, and a plug adjustably threaded in one end portion of the valve bore, that the respective one of the first and second means includes a fitting at least partially located in the opposite end portion of the valve bore and spaced from the plug, said fitting having a valve seat, a passageway opening through the valve seat and to the one of the first and third chambers, and a control rod bore, said valve body having an inlet opening to the valve bore between the plug and fitting, and that the respective one of the first and second means includes a valve stem assembly having a control rod extended through the control rod bore and in abutting relationship with the adjacent diaphragm, and a piston connected to the control rod and located in the valve bore between the fitting and plug for blocking gas flow through the valve seat and alternately permitting gas flow through the valve seat, and resilient means bearing against the plug and piston to urge the piston to a position blocking fluid flow through the valve seat.

2. The apparatus of claim 1 further characterized in that the ratio of effective diaphragm area to valve seat area is at least 600 to 1.

3. Proportional gas mixing apparatus for a first and a second gas from separate sources of pressurized gases and mixing the gases in desired proportions, comprising a first diaphragm, a second diaphragm, first means for mounting the diaphragms and in conjunction with the first diaphragm form a first closed chamber, in conjunction with the second diaphragm form a second closed chamber and in conjunction with the diaphragms form a third closed chamber on the opposite sides of the diaphragms from the first and second chambers, a first valve assembly adapted for connection to the first source and in operative relationship with the first diaphragm for supplying the first gas to the first chamber and establishing and substantially maintaining a datum pressure in the first chamber, a second valve assembly adapted for connection to the second source and in operative relationship with the second diaphragm for supplying the second gas to the second chamber and establishing and maintaining pressure in the second chamber substantially the same as in the first chamber, and infinitely variable second means for receiving gases from the first and second chambers and delivering a mixed gas of selected proportions of said first and second gases, said second means including third means defining a first orifice, fourth means defining a second orifice, fifth means for fluidly connecting the first chamber to the first orifice, sixth means for fluidly connecting the second chamber to the second orifice, and adjustable seventh means cooperating with the orifices for substantially simultaneously proportionally inversely varying the effective area of opening of the orifices to control the flow of gases therethrough, and said first valve assembly including a valve body having a valve bore extending therethrough that has opposite threaded end portions, a plug adjustably threaded into one threaded end portion, a fitting threaded into the opposite end portion and having a connecting rod bore opening at one end into the first chamber and opening to the valve bore between the plug and fitting, a valve stem assembly reciprocally mounted by the plug and fitting for movement between a position blocking fluid flow through the first assembly to the first chamber and a second position permitting fluid flow through the first assembly to the first chamber, said valve stem assembly including a control rod slidably extended through the control rod bore and in abutting relationship with the first diaphragm for movement thereby from the first position to the second position, and spring means in abutting relationship with the plug and valve stem assembly for resiliently urging the valve stem assembly to its first position whereby adjustably threading the plug varies the force required to move the valve stem assembly from its first position to its second position to permit the valve stem assemblies establishing and maintaining substantially equal pressures in the first and second chambers during use.

4. The apparatus of claim 3 further characterized in that a null meter is fluidly connected to the fifth and sixth means for indicating any difference of fluid pressure in the fifth and sixth means.

5. The apparatus of claim 3 further characterized in that there is provided a pressure regulator having an outlet fluidly connected to the third chamber for establishing and maintaining a reference pressure in the third chamber during use and an inlet adapted for fluid connection to the same source of gas as the first valve assembly.

6. The apparatus of claim 3 further characterized in that the fitting has a valve seat in surrounding relationship to the connecting rod bore and that the valve stem assembly has a piston seatable against the valve seat to block fluid flow therethrough, the valve seat that is seatable against the piston having an area that is of a ratio of less than 1 to 900 in relation to the area effective area of the first diaphragm.

7. Proportional gas mixing apparatus for a first and a second gas from separate sources of pressurized gases and mixing the gases in desired proportions, comprising a first diaphragm, a second diaphragm, first means for mounting the diaphragms and in conjunction with the first diaphragm form a first closed chamber, in conjunction with the second diaphragm form a second closed chamber and in conjunction with the diaphragms form a third closed chamber on the opposite sides of the diaphragms from the first and second chambers, a first valve assembly adapted for connection to the first source and in operative relationship with the first diaphragm for supplying the first gas to the first chamber and establishing and substantially maintaining a datum pressure in the first chamber, a second valve assembly adapted for connection to the second source and in operative relationship with the second diaphragm for supplying the second gas to the second chamber and establishing and maintaining pressure in the second chamber substantially the same as in the first chamber, a mixer assembly having an outlet port and spaced inlet second and third ports, first conduit means for placing the second port in fluid communication with the first chamber and second conduit means for placing the third port in fluid communication with the third chamber, said mixer assembly having a first passageway including a first orifice fluidly connecting the second inlet to the outlet, a second passageway including a second orifice fluidly connecting the third inlet to the outlet and adjustable means cooperating with the orifices to substantially simultaneously proportionally inversely vary the effective areas of openings of the orifices to control the flow of gases therethrough, the second valve assembly including a valve body having a valve bore extending therethrough, said bore having an intermediate diametric portion remote from the second chamber, an enlarged diametric portion opening to the intermediate diametric portion and being between the intermediate diametric portion and the second chamber, a fitting at least partially located in the end portion of the bore between the enlarged diametric portion and the second chamber, said fitting having a valve seat, a fluid passageway opening through the valve seat and to the second chamber, and a control rod bore, said valve body having an inlet opening to the valve bore between the intermediate diametric portion and fitting, a valve stem assembly having a control rod extended through the control rod bore into abutting relationship with the adjacent diaphragm, and a piston connected to the control rod and located in the valve bore between the fitting and the intermediate diametric portion for blocking gas flow through the valve seat and alternatively permitting gas flow through the valve seat, resilient means in the valve bore bearing against the valve body remote from the fitting and the piston to urge the piston to a position blocking fluid flow through the valve seat, and a plunger of a substantially smaller diameter than the piston that is connected to the piston opposite the control rod and slidably extended into the intermediate diametric portion.

8. The apparatus of claim 7 further characterized in that the valve stem assembly includes an O-ring mounted on the plunger for movement therewith to form a sliding fit with peripheral wall defining the intermediate diametric bore portion.

9. The apparatus of claim 8 further characterized in that said control rod bore has a bore portion opening through the valve seat that defines part of the fitting passageway and that the intermediate bore portion is of a constant diameter and of a diameter that is the same as that of the control rod bore portion.

10. The apparatus of claim 8 further characterized in that the ratio of effective diaphragm area to valve seat area is at least 600 to 1.

11. The apparatus of claim 10 further characterized in that there is provided a pressure regulator having an outlet fluidly connected to the third chamber for establishing and maintaining a reference pressure in the third chamber during use and an inlet adapted for fluid connection to the same source of gas as the first valve assembly.

12. Proportional gas mixing apparatus for a first and a second gas from separate sources of pressurized gases and mixing the gases in the desired proportions, comprising a housing having opposed first and second walls, a first and a second diaphragm mounted by the housing to divided the housing into three closed chambers with a first chamber between the first wall and the first diaphragm, a second chamber between the diaphragms and a third chamber between the second diaphragm and the second wall, said housing having a pressure regulator port opening to the second chamber, a pressure regulator fluidly connected to the pressure regulator port for applying gas under pressure to the first port, an operable first valve assembly adapted for connection to the first source and mounted on the first wall for supplying gas under pressure to the first chamber, an operable second valve assembly adapted for connection to the second source and mounted on the housing second wall for supplying gas under pressure to the third chamber, each wall having an opening therethrough to the first and third chamber respectively, said first and second valve assemblies including first and second means respectively extending through the wall openings and abutting against the first and second diaphragms for blocking gas flow into the first and third chambers and opening a gas flow path extending through the wall opening into the respective first and third chamber when the pressure is below an equilibrium state relative the pressure in the second chamber, a mixer assembly having an outlet port and inlet second and third ports, a first fluid conduit line having one end mounted by the first wall and opening to the first chamber and a second end connected to the second port for placing the second port in fluid communication with the first chamber and a second fluid conduit line having one end mounted by the second wall and opening to the third chamber and a second end connected to the third port for placing the third port in fluid communication with the third chamber, said mixer assembly having a first passageway including a first orifice fluidly connecting the second inlet to the outlet, a second passageway including a second orifice fluidly connecting the third inlet to the outlet and adjustable needle valve means cooperating with the orifices to substantially simultaneously proportionally inversely vary the effective areas of openings of the orifices to control the flow of gases therethrough.

13. The apparatus of claim 12 further characterized in that each of said valve assembly is a balanced valve assembly and that each of the first and second means includes a valve seat, a control rod movably extended through the valve seat into abutting relationship with the respective diaphragm, a piston mounted on the control rod for movement therewith between a position abutting against the valve seat for blocking fluid flow through the valve seat to the respective first and third chamber and a position spaced from the valve seat, the ratio of effective diaphragm area to valve seat area being at least 600 to 1.

14. The apparatus of claim 12 further characterized in that each of the valve assemblies includes a first bore portion, a second bore portion of a larger diameter than the first bore portion that opens to the first bore portion and is between the first bore portion and said chambers, and that each of the first and second means includes a valve seat opening to the respective second bore portion and a valve stem assembly having a plunger member forming a sliding fit with the respective first bore portion and a piston attached to the plunger for movement therewith and seatable against the valve seat to block fluid flow therethrough, the first bore portion having a cross-sectional area the same as that of the valve seat opening.

* * * * *